March 11, 1930.  L. BOUDIN  1,749,798
MANUFACTURE OF GLASS SHEETS
Filed April 8, 1927   2 Sheets-Sheet 1
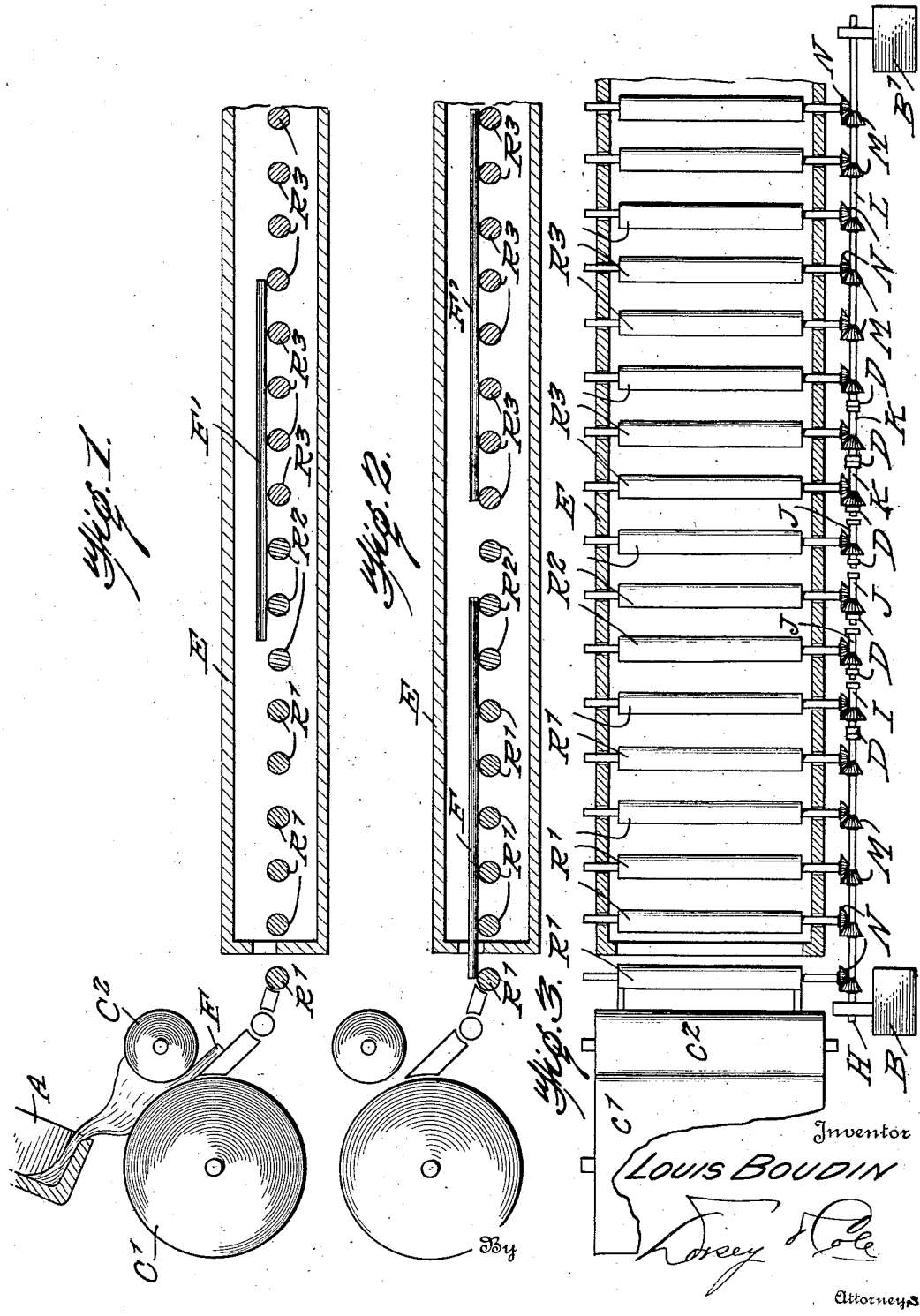
Inventor
LOUIS BOUDIN
By
Attorneys March 11, 1930. L. BOUDIN 1,749,798
MANUFACTURE OF GLASS SHEETS
Filed April 8, 1927 2 Sheets-Sheet 2
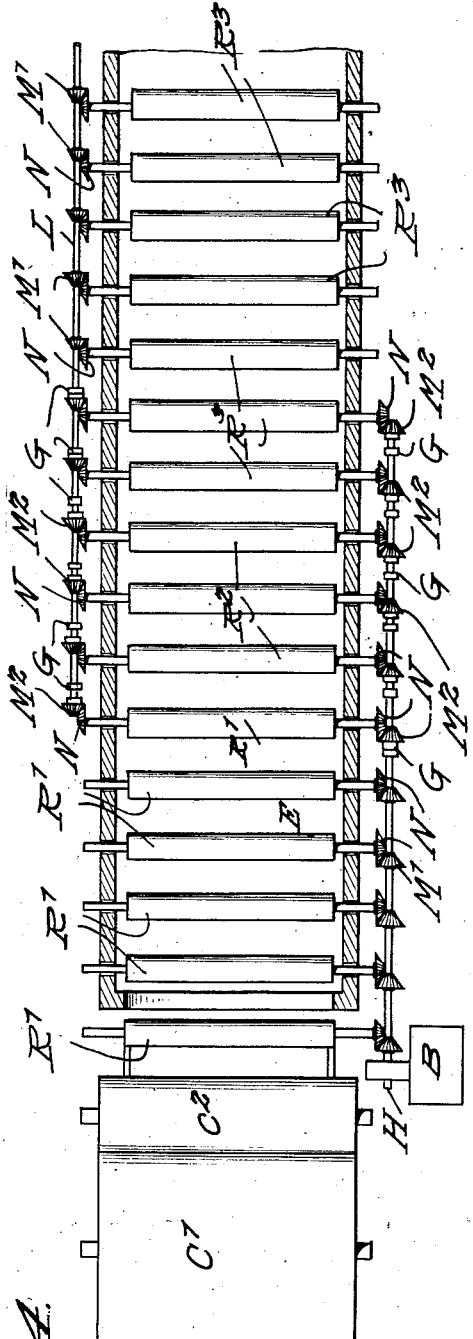
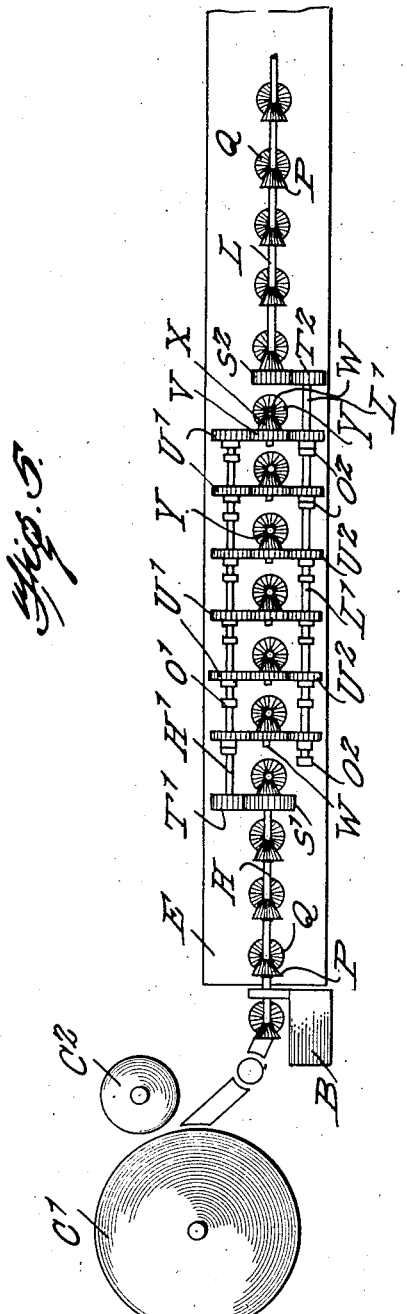
INVENTOR.
LOUIS BOUDIN,
BY
ATTORNEYS Patented Mar. 11, 1930

1,749,798

UNITED STATES PATENT OFFICE

LOUIS BOUDIN, OF ST.-GOBAIN, FRANCE, ASSIGNOR TO SOCIETE ANONYME DES MANU-
FACTURES DES GLACES & PRODUITS CHIMIQUES DE SAINT-GOBAIN, CHAUNY &
CIREY, OF PARIS, FRANCE

MANUFACTURE OF GLASS SHEETS

Application filed April 8, 1927, Serial No. 182,111, and in France April 15, 1926.

The intermittent manufacture of glass sheets and plates (hereinafter collectively termed sheets) differs from the continuous process in that much higher speeds of formation are employed during the actual period of sheet formation, with pauses between the formation of successive sheets. This high speed of sheet formation is of an advantage in improving the quality of the product.

While in the manufacture of the continuous sheets it has been the general practice to pass them directly from the forming machines to and through the lehrs on beds of rollers, special provisions are necessary to do this in the intermittent process, because the high speed of the travel necessary to receive sheets formed at the speed of the intermittent machines, would pass them through a considerable distance during the time required for annealing and hence excessively long lehrs must be used. For this reason the intermittent machines generally feed, not directly to the lehrs, but to a table from which the sheets, after being completely formed are moved into the lehr, through which they are passed by shoving them on the tile bottoms of the lehrs, or through which they are carried by some form of conveyor, or both combined. It is the purpose of the present invention to provide a method comprising the reception by a lehr conveyer of sheets directly from an intermittent forming machine and transporting the same through the lehr, the speed at which the sheets or plates are received being the same as the speed of sheet formation and the speed at which they are subsequently carried through the lehr being that suitable for proper annealing. To this end this invention comprises a method of receiving and feeding glass sheets from an intermittent forming machine and of passing the same through the lehr and of mechanism adapted to carry out the said process, as will hereinafter be more fully described and claimed.

In the accompanying drawings in which corresponding parts are designated by corresponding marks of reference,—

Figures 1 and 2 are diagrammatic longitudinal horizontal sections of a mechanism adapted to carry out the process to which this application is directed and embodying the mechanism here claimed.

Figures 3 and 4 are diagrammatic horizontal sectional views showing different forms in which the mechanism may be embodied, while Figure 5 is a side elevation of another form.

In these drawings an intermittent forming machine of the well known "Chance" type is represented by the rollers $C'$ and $C^2$ having a forming pass between them. A is a pot or ladle adapted to deliver glass adjacent to the forming pass.

As represented this machine is immediately opposite the entrance end of the lehr E, which may be heated to a regulated temperature in any desired manner.

The forming machine delivers sheet glass to a bed comprising a series of rollers $R'$, $R^2$, $R^3$, etc., one or more of which may be between the forming machine and the entrance end of the lehr, but the majority of which are within the lehr. Certain of these rollers $R'$, located at the entrance end of the lehr are driven at different times at different speeds. Other rollers, $R^2$, adjacent thereto and following them in the bed may be idlers, while the remaining rolls, $R^3$, are driven at a constant speed equal to the lower speed at which the rollers $R'$ are driven.

With such an arrangement of rollers, during the time which a sheet is being delivered to the bed and while it is being formed, the rollers $R'$ are driven at the same peripheral speed as are the forming rolls (which is the linear speed of sheet formation), so that the sheet is received by the roller bed from the forming pass as it is formed without buckling, this speed being as stated relatively high. After the tail of the sheet has left the forming pass (see Fig. 2), the speed of the rollers $R'$ is reduced. The sheet F is fed by the rollers $R'$ onto the idler rollers $R^2$ and onto the first of the rollers $R^3$ of the second series of driven rolls, by which its travel is continued at the reduced speed. The sheet (see $F'$ in Figure 1) being clear of the rollers $R'$ the latter may be speeded up to the speed of sheet formation and a new sheet F fed thereto as is represented in Figure 1. The new sheet is fed over the rollers R' and onto the rollers R² while the preceding sheet F' continues to travel under the influence of the rollers R³, and after the new sheet F clears the forming pass the speed of the rollers R' may again be reduced, after which time the sheet F will follow at a fixed distance behind the sheet F' and at a speed uniform therewith, it being in its continued movement engaged by the first of the rollers R³, as above described for the sheet F'.

It is obvious that the desired length of bed covered by the rollers R' and R² will vary with the length of sheet to be formed in the forming machine, that the desired space covered by the driving rolls R' will also vary with this length, and that the spacing between the rear and front ends of successive plates will vary with the distance covered by the rollers R², with the relation existing between the two speeds of the rollers R' and with the time interval between the delivery of successive sheets to the roller bed. For these reasons it is desirable to provide means by which certain rollers intermediate of the ends of the bed may be changed from idlers to drivers or vice versa, and to accomplish this different mechanisms may be employed. As shown in Figure 3 two main drives are shown, one, B, being a variable speed motor, and the other, B', a fixed speed motor. The motor B drives the shaft H having fast thereon a number of beveled gears M meshing with corresponding gears N on the first group of driven rollers (R'). The motor B' drives a shaft L having also fast thereon beveled gears M driving through corresponding gears N a second group of driven rollers R³. The two shafts H and L are in alignment and the space between their adjacent ends is occupied by a series of intermediate shafts I, J and K, each having a beveled gear M thereon, meshing with beveled gears N on the rollers intermediate of the two driven sets. The end shafts I and K are adapted to be connected with the shafts H and L respectively, by means of clutches D, while the shafts J can be connected to I and K, if adjacent thereto, or to the adjacent shafts J, also by clutches D. By this construction it will be seen that the rollers geared to the shaft H are driven by the variable speed motor B and the rollers geared to the shaft L are correspondingly driven by the constant speed motor B. Whether the rollers in between these driven rollers are driven or idlers will depend upon the position of the clutches D, the arrangement being such that any one or more rollers adjacent to a driven set may be connected to be driven in unison therewith or be disconnected from the drives, so that the end of the space covered by the driving rollers R' and the commencement of the space covered by the drivers R³ may be independently varied to suit the problems of manufacture.

In Figure 4 a somewhat different mechanism is represented. In this the shafts H and L are located on opposite sides of the lehr, the one shaft overlaps the other. The first (R') and last (R³) series of rollers are driven from the shafts H or L respectively, through beveled gears M' fast on such shafts and meshing with beveled gears N on the proper ends of the rollers. The intermediate rollers have beveled gears N on opposite ends meshing with gears M² loose on the shafts H and L, each gear M² being capable of being locked to its shaft by a clutch G. It will be thus seen that by disengaging or engaging the clutches G, the rollers of the intermediate series may be engaged with the shaft H or L driving the adjacent series of driven rollers, while if the clutches G on both sides of the lehr are opened such rollers will become idlers.

In Figure 5, a construction is shown in which the shafts H and L are, as in Figure 3, in line, the shafts H and L driving the driven rollers (R' and R³) of the first and last series, respectively, through the beveled gears P and Q. The shaft H also drives through the gears S' and T' the upper supplemental shaft H', while the shaft L similarly drives through the gears S² and T², the lower supplemental shaft L', these two overlapping. The rollers covered by the overlap of these shafts have beveled gears Y upon their ends meshing with bevel gears X fast to spur gears V loose on a shaft W. Each of these spur gears V meshes with a corresponding spur gear U', on the shaft H' and with a spur gear U² on the shaft L'. The spur gears U' and U² are adapted to be locked to their respective shafts by means of clutches O' and O², respectively, so that in this case also the intermediate rollers may be rendered either idlers or drivers.

It is obvious that the character of gearing between the shafts H and L on the one hand and the several rolls on the other may be varied to meet requirements, as the specific character of such gearing (beveled or sphered) is not the essence of this invention.

Having thus described my invention what I claim is:—

1. The combination with an intermittent sheet glass forming machine, of a lehr receiving glass from the forming machine as formed, rollers within the lehr to receive the sheet from the forming machine, rollers within the lehr having a substantially constant speed which is less than that of the sheet formation, and means whereby the speed of the first series of rollers may be varied from a speed equal to that of sheet formation to the speed of the second series of rollers, and idler rollers in the lehr intermediate of said sets of rollers.

2. The combination with an intermittent sheet glass forming machine, of a lehr receiving glass from the forming machine as formed, rollers within the lehr to receive the sheet from the forming machine, rollers within the lehr having a substantially constant speed which is less than that of the sheet formation, and means whereby the speed of the first series of rollers may be varied from a speed equal to that of sheet formation to the speed to the second series of rollers, rollers in the lehr intermediate of the said two sets of rollers and means for connecting one or more of the said last-named rollers with the drive for one of the other sets of rollers.

3. The combination with an intermittent sheet glass forming machine, of a lehr receiving glass from the forming machine as formed, rollers within the lehr to receive the sheet as formed and to transport the same, a variable speed drive for certain of the rollers near the entrance end of the lehr, a substantially constant speed drive for certain of the rollers near the exit end of the lehr, and connection by which certain of the rollers intermediate of the lehr and adjacent to the end series of rolls may be connected with the drive for the rolls adjacent thereto.

4. The combination with an intermittent glass-forming machine, of a lehr receiving glass from the forming machine as formed, rollers within the lehr to transport the sheets, two drive shafts exterior of the lehr, gearing and clutch mechanisms between said rollers and each of the two shafts, one of the shafts having a constant speed such as to drive the rollers connected therewith at a peripheral velocity equal to the speed of sheet formation, and the other of said shafts having a constant speed such as to drive the rollers connected therewith at a less speed.

5. The combination with an intermittent sheet glass forming machine, and with a lehr to receive the sheet as formed, of at least five groups of rollers arranged along the length of the lehr, means for driving the rollers of the first group at a variable speed, means for engaging and disengaging rollers of the second group with and from the drive of the first group, means for driving the rollers of the fifth group at a substantially constant speed, and means for engaging and disengaging the rollers of the fourth group with and from the drive of the rollers of the fifth group, the rollers of the third group being idlers.

6. The combination with an intermittent sheet glass forming machine, and with a lehr to receive the sheet as formed, of at least five groups of rollers arranged along the length of the lehr, means for driving the rollers of the first group at substantially the speed of sheet formation, means for engaging and disengaging rollers of the second group with and from the drive of the first group, means for driving the rollers of the fifth group at a substantially constant speed, and means for engaging and disengaging the rollers of the fourth group with and from the drive of the rollers of the fifth group, the rollers of the third group being idlers.

In testimony whereof I hereunto affix my signature.

LOUIS BOUDIN.